2,519,174

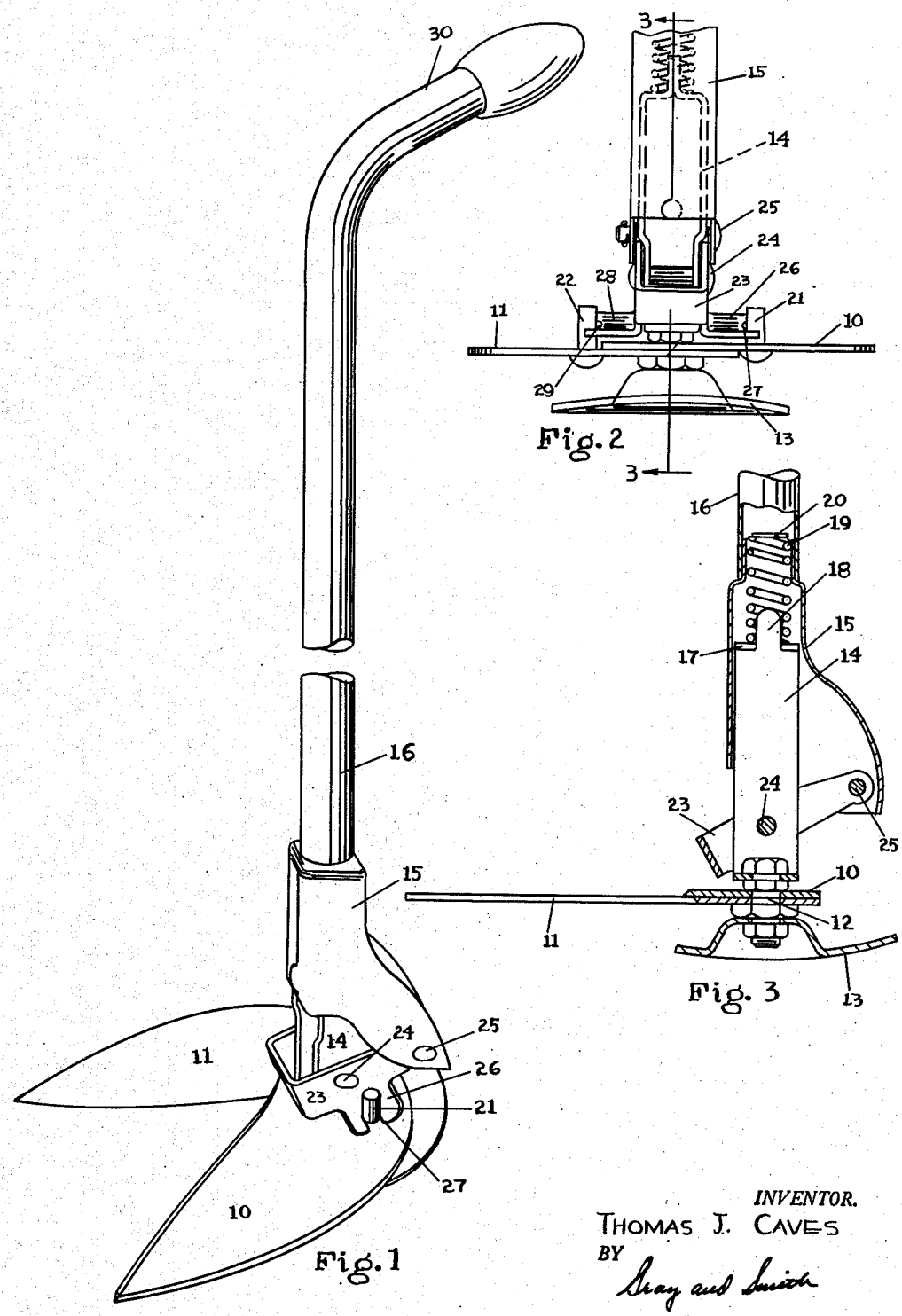
Aug. 15, 1950 — T. J. CAVES — 2,519,174
LAWN SHEARS
Filed July 12, 1945
INVENTOR.
THOMAS J. CAVES
BY
ATTORNEYS Patented Aug. 15, 1950

UNITED STATES PATENT OFFICE 2,519,174

LAWN SHEARS

Thomas J. Caves, Dearborn, Mich.

Application July 12, 1945, Serial No. 604,577

3 Claims. (Cl. 56—241)

The present invention relates to lawn shears which are particularly adapted for cutting grass, weeds, and the like.

The principal object of the present invention is the provision of simple and practical lawn shears designed and adapted to enable the user to assume a comfortable upright position while operating the shears, to the end that the work of cutting may be performed readily and efficiently with a minimum of discomfort to the user.

Another object of the present invention is to provide grass shears which are convenient to use, positive in their operation, and which are so designed that they may be readily manufactured at a relatively low cost by mass production methods.

A further object of the present invention is to provide lawn shears of simple and durable construction which have a relatively long life in service and in which any part is readily replaceable in the event of breakage or bending of the parts so that it will not perform its intended function.

Another object of the present invention is to provide a lawn shear device having a pair of pivotally mounted blades operatively connected with operating means for moving both blades upon exertion of a downward pressure on the elongated handle for operating the blade actuating mechanism.

Other objects of this invention will appear in the following description and appended claims, reference being had to the accompanying drawings forming a part of this specification wherein like reference characters designate corresponding parts in the several views.

In the drawings:

Fig. 1 is a perspective view of a pair of lawn shears embodying the present invention.

Fig. 2 is a front elevation of the shear blades and blade actuating mechanism of the device shown in Fig. 1.

Fig. 3 is a longitudinal section taken substantially on the line 3—3 of Fig. 2 in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The lawn shears of the present invention include a pair of shear blades 10 and 11 pivoted on a central pivot 12 to one end of which is attached a curved ground engaging pressure plate 13. On the other end of the central pivot 12 is attached the bottom portion of a vertical rigid bracket 14, which extends upwardly into the housing 15 secured to an elongated tubular handle 16, which is suitably bent at its other end to form an angularly extending handle or gripping portion 30. The top of the vertical rigid bracket 14 is provided with a spring seat 17 having a vertically extending pilot 18. A compression spring 19 is seated on the spring seat 17 around the pilot 18 and has its top portion engaged by inturned lugs 20 provided on the top portion of the housing 15.

The shear blades 10 and 11 are each provided with a vertically extending actuating stud. The actuating stud attached to blade 10 is indicated by the numeral 21 and that attached to blade 11 is indicated by the numeral 22. A double bell-crank yoke 23 is pivotally connected at its fulcrum point by the cross-pin 24 with the vertical bracket 14 and is pivotally connected at one end by the cross-pin 25 with the housing 15. The yoke member 23 is provided with extending lugs 26 and 28 on its opposite end. A slot 27 is provided in the extending lug 26 for engagement with the vertical stud 21 on the blade 10. A slot 29 is provided in the extending lug 28 for engaging the vertical stud 22 on the blade 11.

To operate the lawn shears of the present invention the pressure plate 13 is placed in contact with the ground surface. As shown in Figs. 2 and 3 the pressure plate 13 is curved to provide a rocker surface for contacting the ground surface and provide a bearing thereon through a wide range of angularity of the handle 16 relative to the ground.

Thus by rocking the handle 16 on the curved pressure plate 13 the operator may regulate the distance of the blades 10 and 11 above the ground surface, and thus regulate the height of cut to be made. Upon the application of pressure on the handle 16, the pressure plate 13 acts as a reaction member so that the pressure applied on the handle 16 effects a downward movement of the housing 15 relative to the rigid vertical housing 14, and relative to the shear blades 10 and 11. This movement is resiliently resisted by the spring 19 which is compressed by the continued forces exerted on the handle 16. The downward movement of the housing 15 causes the yoke 23 to pivot at its fulcrum about the cross pin 24 and to exert a force through the lugs 26 and 28 and the slots 27 and 29 on the actuating studs 21 and 22, causing the blades 10 and 11 to pivot about the stud 12 and close with a shearing action. Upon release of the pressure on the handle 16, the spring 19 returns the parts to their initial positions and opens the shear blades 10 and 11 for the next operation.

An important feature of the present construction is the double bell-crank yoke member 23 which multiplies the force exerted thereon by the movement of the housing 15, and distributes this force equally to the shear blades 10 and 11. This assures a uniform cutting movement of both of said blades with a readily applied force of sufficient magnitude to insure a clean cutting action by the said blades.

The blades 10 and 11 are preferably stamped from sheet metal stock and then hardened. Utilizing this construction the cutting edges may be readily sharpened and when so sharpened will be found to hold their cutting edge during long periods of use.

From the foregoing it will be seen that all parts of the lawn shears and the operating mechanism therefor are designed for ready construction and ease of assembly in mass production. This construction provides a conveniently usable device which is readily operable with a minimum of effort exerted by the user.

When assembling the lawn shears of the present invention, the housing 15 is inverted and the spring 19 is dropped in place against the inturned lugs 20. The shear blades 10 and 11 and the pressure plate 13 are connected with the bottom of the vertical bracket 14. The double bell crank yoke 23 is pivotally secured to the side of the vertical bracket 14 by the cross-pin 24. The locating stud 18 on the top of the rigid vertical bracket 14 is then inserted in the spring 19 and the spring seat 17 thereon contacts the bottom of the spring. The ends of the double bell crank yoke 23 are then pivotally secured to the housing 15 by the cross pin 25. The tubular handle 16 is then pressed into the top portion of the housing 15 and the lawn shears are assembled and ready for use.

I claim:

1. Lawn shears comprising a ground contacting plate, a vertically disposed rigid bracket member secured at its lower end to said ground contacting plate, a pair of horizontally disposed shearing blades mounted for pivotal movement between said ground contacting plate and said bracket member, actuating studs on the upper surfaces of said blades and in substantially diametrically opposed positions with respect to the axis of pivotal movement of said blades, a housing mounted about the upper end of said bracket member and vertically moveable relative thereto, spring means operable to bias said housing vertically upwardly from said bracket member, a handle secured to said housing and operable to move said housing vertically downwardly in opposition to said spring means, and a mechanism for converting vertical forces applied to said housing to horizontal forces for pivoting said blades about said axis and including a bell crank lever pivotally connected at its fulcrum to said bracket member for movement in a vertical plane, one arm of said bell crank lever being pivotally connected to said housing whereby vertical movement of said housing will cause pivotal movement of said one arm about said fulcrum, the other arm of said bell crank lever being bifurcated to extend to each of said actuating studs, the outer ends of said other arm having slots therein for receiving said actuating studs whereby pivotal movement of said other arm will cause a force to be applied to each of said actuating studs substantially normal to the path of movement thereof.

2. In a lawn shears, a vertically disposed rigid bracket member, a pair of horizontally disposed shearing blades pivotally mounted on the lower end of said rigid bracket member, each of said blades having a stud on its upper surface spaced radially from the point of pivotal movement of said blades, a vertical force applying member operatively associated with said rigid bracket member for vertical movement with respect thereto, and a bell crank lever pivotally connected at its fulcrum to said bracket member for movement in a vertical plane, one arm of said bell crank lever being pivotally connected to said vertical force applying member, the other arm of said double bell crank lever being bifurcated to extend to each of said actuating studs, the outer ends of said other arm having slots therein for receiving said studs, said double bell crank lever, force applying member and studs being so constructed and arranged that said one arm will be substantially normal to a portion of the path of vertical movement of said force applying member and said other arm will be substantially normal to a portion of the paths of movement of said studs during closing and opening of said shears.

3. Lawn shears comprising a ground contacting plate, a vertically disposed rigid bracket member secured at its lower end to said ground contacting plate, a pair of horizontally disposed shearing blades mounted for pivotal movement between said ground contacting plate and said bracket member, a housing mounted about the upper end of said bracket member and vertically movable relative thereto, a coil spring seated at its one end on said bracket member and at its other end in said housing for biasing said housing vertically upward, a handle secured to said housing and extending vertically upward therefrom for moving said housing vertically downward in opposition to said coil spring and a bell crank lever pivotally connected at its fulcrum to said bracket member for movement in a vertical plane, one arm of said bell crank lever being pivotally connected to said housing, the other arm of said bell crank lever being bifurcated to provide a connection to each of said shearing blades at points radially outwardly from the axis of pivotal movement of said shearing blades, said points being located on a straight line passing through said axis when said shears are in a partially closed position.

THOMAS J. CAVES.

REFERENCES CITED

The following references are of record in the file of this patent:

UNITED STATES PATENTS

| Number | Name | Date |
| --- | --- | --- |
| 756,227 | Fisk | Apr. 5, 1904 |
| 1,222,950 | Heidl | Apr. 17, 1917 |
| 1,891,694 | Svendsgaard | Dec. 20, 1932 |